(12) United States Patent
Albers et al.

(10) Patent No.: US 12,209,589 B2
(45) Date of Patent: Jan. 28, 2025

(54) BEARING ARRANGEMENT FOR GUIDING A MOTOR SHAFT OF A VERTICAL TURBINE PUMP

(71) Applicant: WILO SE, Dortmund (BE)

(72) Inventors: Daniel Albers, Dortmund (DE);
Maksim Kirpo, Dortmund (DE);
Shashank Pawar, Dortmund (DE)

(73) Assignee: WILO SE, Dortmund (BE)

( * ) Notice: Subject to any disclaimer, the term of this patent is extended or adjusted under 35 U.S.C. 154(b) by 0 days.

(21) Appl. No.: 18/469,638

(22) Filed: Sep. 19, 2023

(65) Prior Publication Data

US 2024/0093580 A1 Mar. 21, 2024

(30) Foreign Application Priority Data

Sep. 20, 2022 (BE) .................. 2022/5744

(51) Int. Cl.
| | | |
|---|---|---|
| *F04D 13/08* | (2006.01) | |
| *F04D 29/049* | (2006.01) | |
| *F04D 29/06* | (2006.01) | |
| *F16C 19/36* | (2006.01) | |
| *F16C 33/66* | (2006.01) | |

(52) U.S. Cl.
CPC ........... *F04D 13/08* (2013.01); *F04D 29/049* (2013.01); *F04D 29/061* (2013.01); *F16C 19/364* (2013.01); *F16C 33/6666* (2013.01); *F16C 2360/00* (2013.01)

(58) Field of Classification Search
CPC ...... F04D 29/046; F04D 29/049; F04D 29/06; F04D 29/061; F04D 29/063; F04D 13/08; F16C 33/6666; F16C 33/6685; F16C 2360/00; F16C 19/364
See application file for complete search history.

(56) References Cited

U.S. PATENT DOCUMENTS

| | | | | |
|---|---|---|---|---|
| 2,188,856 A | * | 1/1940 | Chievitz | ............... F16C 33/78 |
| | | | | 277/424 |
| 2002/0164245 A1 | * | 11/2002 | Okamura | ............ F04D 29/4273 |
| | | | | 415/58.4 |

(Continued)

FOREIGN PATENT DOCUMENTS

| | | |
|---|---|---|
| DE | 3214030 A1 | 12/1982 |
| EP | 0233593 A2 | 8/1987 |

(Continued)

OTHER PUBLICATIONS

Search Report (with English translation) received in corresponding Application No. BE 2022/5744, dated Apr. 14, 2023, 14 pages.

*Primary Examiner* — Elton K Wong
(74) *Attorney, Agent, or Firm* — Dority & Manning, P.A.

(57) ABSTRACT

A bearing arrangement for guiding a motor shaft for supporting axial and/or radial forces of a vertical turbine pump. The bearing arrangement includes a bearing comprising an inner ring which can be non-rotatably connected to the motor shaft and an outer ring, an oil sump filled with an oil, within which the bearing is arranged at least partially immersed in the oil, and an inner oil deflector which is non-rotatably connected to the inner ring and deflects oil conveyed between the inner ring and the outer ring back into the oil sump as a result of rotation of the bearing.

12 Claims, 2 Drawing Sheets

(56) References Cited

U.S. PATENT DOCUMENTS

2014/0093201 A1* 4/2014 Hashish .................... F16N 7/14
                                                        384/606
2019/0203727 A1* 7/2019 Perrino .................. F04D 19/04

FOREIGN PATENT DOCUMENTS

| JP | S 5578896 U | 5/1980 |
| WO | WO 2007040427 A1 | 4/2007 |

* cited by examiner

BEARING ARRANGEMENT FOR GUIDING A MOTOR SHAFT OF A VERTICAL TURBINE PUMP

CROSS-REFERENCE TO RELATED APPLICATIONS

This application is based upon and claims the right of priority to Belgium Patent Application No. 2022/5744, filed on Sep. 20, 2022, the disclosure of which is hereby incorporated by reference herein in its entirety by reference for all purposes.

TECHNICAL FIELD

The invention relates to a bearing arrangement for guiding a motor shaft for supporting axial and/or radial forces of a vertical turbine pump, comprising a bearing comprising an inner ring which can be non-rotatably connected to the motor shaft and an outer ring, and an oil sump which is filled with an oil and within which the bearing is arranged at least partially immersed in the oil. The invention further relates to the vertical turbine pump comprising a riser pipe extending along an axis, a motor shaft disposed in the riser pipe, a motor disposed at an upper riser pipe end and driving the motor shaft, an impeller disposed at an opposite lower riser pipe end and driven by the motor shaft for conveying a fluid into the riser pipe, and the bearing arrangement guiding the motor shaft.

BACKGROUND OF THE INVENTION

Vertical turbine pumps, also known as vertical turbine, semi-axial pumps or borehole pumps, are vertical pumps that are used, for example, to extract water from rivers, wells and boreholes and are used in particular in water supply and in industrial applications. Delivery heads of 40 to 250 meters, for example, can be achieved by connecting several impellers in series.

Vertical turbine pumps usually comprise a motor mounted on some kind of socket or motor mount. A motor shaft may be either directly attached to or coupled with the motor and extends downward toward an impeller through a column mount or a vertical pipe arrangement, also called a riser pipe. The impeller contains a plurality of impeller blades that rotate with the motor and motor shaft, and thus deliver fluid downward into the riser pipe.

In known vertical turbine pumps, the motor shaft is usually supported below the motor at the riser pipe by means of a roller bearing. In order to avoid overheating of the roller bearing, which drastically reduces the service life, most bearings are cooled by an external auxiliary system. The auxiliary system cools a bearing oil of the roller bearing by means of cooling coils, which are arranged in the bearing oil and through which a cooling liquid flows. The cooled oil in turn cools the roller bearing.

However, such external auxiliary systems for cooling are expensive and require regular maintenance during operation, which makes the operating costs of such external auxiliary systems expensive. While applications without external cooling have been tested in pilot projects, the results to date, however, do not allow a stable, maintenance-free operation of the vertical turbine pumps, for example, because the oil flow disrupts over time or too much air gets into the oil, which has a negative effect on cooling.

DESCRIPTION OF THE INVENTION

Based on this situation, it is an object of the present invention to provide a bearing arrangement for guiding a motor shaft for supporting axial and/or radial forces of a vertical turbine pump, which ensures reliable cooling of a bearing of the bearing arrangement without an external cooling system.

The object of the invention is achieved by the features of the independent claims. Advantageous embodiments are provided in the sub-claims.

Accordingly, the object is achieved by a bearing arrangement for guiding a motor shaft of a vertical turbine pump, comprising:
- a bearing comprising an inner ring which can be non-rotatably connected to the motor shaft and an outer ring,
- an oil sump which is filled with an oil and in which the bearing is arranged at least partially immersed in the oil, and
- an inner oil deflector which is non-rotatably connected to the inner ring and deflects oil conveyed between the inner ring and the outer ring back into the oil sump due to rotation of the bearing.

A key feature of the proposed solution is passive cooling of the bearing, so that no external and usually expensive auxiliary system is required to cool the bearing. In this way, the operating costs of the vertical turbine pump can be reduced. Furthermore, the proposed internal oil deflector allows a homogeneous temperature in the bearing, which optimizes the service life of the bearing and of the oil used for cooling. As a result, the proposed solution reduces a risk of failures, thus increases the operational stability of the vertical turbine pump. In addition, it has been shown experimentally that, compared to other prior art passive cooling designs, in the proposed solution no disruption in the oil flow arises, which leads to better heat transfer and thus cooling of the bearing. In other words, designs known from the prior art with passive cooling simply do not work reliably.

Vertical turbine pumps are usually referred to as vertical pumps that can be used for wells or boreholes. Such vertical turbine pumps often comprise a riser pipe in which the motor shaft is provided and at which the bearing may be held. The riser pipe may be several meters long, so that the axially length of the vertical turbine pump along an axis of the riser pipe or motor shaft is often substantially greater than its radially width. The riser pipe normally extends essentially below a base plate on which the vertical turbine pump may be mounted. The riser pipe is preferably designed from metal and/or comprises a circular or circle-like cross-section.

The inner ring can be connected to the motor shaft either directly or indirectly, for example by means of spacers, in particular in a form- or force-fitting manner. Likewise, the outer ring can be connected either directly or indirectly, for example by means of spacers, to a later-described outer wall of the bearing arrangement, to the riser pipe and/or to a later-described manifold housing, in particular in a form- and/or force-fitting manner. The oil sump extends preferably, as seen in an axial plan view, circumferentially around the motor shaft and/or is arranged, as seen in an axial side view, vertically spaced below the inner ring and/or the outer ring. Where reference is made to axial and/or radial in the context of the application, these terms refer in particular to the motor shaft or an axial extension thereof along an axis.

The oil sump is preferably closed axially downwards and opened axially upwards, in particular partially, so that on the one hand oil can get between the inner ring and the outer ring and on the other hand, deflected by the inner oil deflector, can get back into the oil sump. Preferably, the bearing is completely immersed in the oil. Any oil known from the prior art can be used to cool the bearing. Oil as a coolant has the advantage that it is electrically insulating, has a good lubricating effect and is corrosion-inhibiting for metals. By rotating the bearing, as if due to a rotation of the motor shaft the inner ring rotates relative to the outer ring, a centrifugal force acts on the oil located between the inner ring and the outer ring, which is thus extracted pump-like from the oil sump by the bearing.

The inner oil deflector is preferably provided axially above the inner ring and/or the outer ring, in particular in an axial extension of a bearing axis defined by a roller element provided between the inner ring and the outer ring. The bearing axis thus defined may extend parallel to the axis of the motor shaft. Preferably, the bearing is designed as described below as a tapered roller bearing with inclined roller elements, so that the bearing axis defined in this way is inclined relative to the axis of the motor shaft, in particular extends radially upwards away from it. The oil conveyed by the bearing is preferably deflected by an inner surface of the inner oil deflector oriented downward with respect to the vertical turbine pump, thus in particular does not flow over an outer surface of the inner oil deflector oriented upward. In this way, air is prevented to be mixed into the deflected oil, which would have a negative effect on the cooling effect.

Various options exist for the design of the inner oil deflector. According to a preferred embodiment, the inner oil deflector extends radially outward from the inner ring and/or, as seen in an axial plan view, annularly around the inner ring. In particular, the inner oil deflector extends radially away from the motor shaft. Preferably, the inner oil deflector is configured disc-shaped, in particular in the manner of a washer suitably dimensioned for the vertical turbine pump. Preferably, the inner oil deflector is designed from metal, in particular from a precious metal.

According to a further preferred embodiment, the inner oil deflector is arranged, as seen in an axial side view, above the oil sump, in particular above the bearing, and extends from the inner ring in an umbrella-shaped, arcuate and/or axially oblique manner downward and radially away in the direction of the oil sump. In this respect, the inner oil deflector, as seen in an axial side view, can initially extend radially away from the motor shaft and subsequently be bent, in particular in a circular arc, downward in the direction of the oil sump. Particularly preferably, a tangent of the inner oil deflector is approximately perpendicular to the axial extension of the bearing axis defined by roller elements provided between the inner ring and the outer ring, so that the oil conveyed by the bearing hits approximately perpendicular on the tangent and is deflected accordingly by the inner oil deflector.

According to another preferred embodiment, an outer wall is provided which radially delimits the oil sump and at which a plurality of cooling fins are formed on the outside. The outer wall preferably likewise constitutes the outer wall of the bearing arrangement. The cooling fins preferably extend in the axial direction and are arranged at a distance from one another. Preferably, the cooling fins are provided radially circumferentially around the outer wall. The cooling fins allow the oil deflected by the inner oil deflector and subsequently flowing back into the oil sump, in particular along the outer wall, to be cooled effectively without the need for an external cooling device as known from the prior art.

As previously described, the inner oil deflector is provided non-rotatably at the inner ring so that the inner oil deflector rotates along with a rotation of the motor shaft. According to a further preferred embodiment, an outer oil deflector is additionally provided, which is non-rotatably connected to the outer ring and is arranged axially above the inner oil deflector with respect to the oil sump. According to a further preferred embodiment, the outer oil deflector extends in particular radially inwards from the outer wall and/or, as seen in an axial plan view, extends annularly around the inner ring. This further outer oil deflector is preferably arranged at a distance from, but adjacent to, the inner oil deflector arranged below it. The outer oil deflector can be connected directly to the outer ring or indirectly, for example by means of the outer wall to which the outer ring is preferably fixed. In this respect, the outer oil deflector preferably extends from the outer wall and circumferentially around the motor shaft in the direction of the motor shaft, but does not contact it. Like the inner oil deflector, the outer oil deflector can be of disc-like design made of a metal. The outer oil deflector allows oil that may not have been deflected by the inner oil deflector to be deflected back into the oil sump. Preferably, the inner oil deflector does not contact the outer wall so that oil deflected by the outer oil deflector can flow through a passage between the inner oil deflector and the outer wall.

According to a further preferred embodiment, the bearing arrangement comprises an outer wall radially delimiting the oil sump, at which the outer ring is provided, wherein between the outer wall and the outer ring a collecting pan is provided which, as seen in an axial plan view, extends around the outer ring and serves for collecting the oil deflected by the inner oil deflector. The outer wall may be formed of aluminum, while the remainder of the bearing assembly may be formed of another metal. In this respect, the outer wall can be designed in two parts with respect to the remainder of the bearing arrangement, although a one-piece design is also conceivable. The collecting pan is preferably designed open at the top and/or extends annularly around the motor shaft. The collecting pan is preferably arranged below a radial end of the inner oil deflector, so that undeflected oil can drip from the inner oil deflector into the collecting pan.

According to another preferred embodiment, a plurality of spaced apart, axially extending connecting openings are provided between the collecting pan and the oil sump for draining oil collected in the collecting pan into the oil sump. The connecting openings can be designed as channels which have a slope radially inwards towards the oil sump.

According to a further preferred embodiment, the bearing is designed as a radial bearing, as an axial bearing and/or as an angular ball bearing. Further preferably, the bearing is designed as a roller bearing. The roller elements can be balls, cones or cylinders. Likewise, other designs of the bearing may be possible. Preferably, the surfaces of the inner ring and the outer ring facing each other are arranged obliquely with respect to the axis of the motor shaft, in particular at an angle of 45°.

The object of the invention is further achieved by the vertical turbine pump comprising:
- a riser pipe extending along an axis;
- the motor shaft arranged in the riser pipe;
- a motor disposed at an upper riser pipe end and driving the motor shaft;
- an impeller disposed at an opposite lower riser pipe end and driven by the motor shaft for conveying a fluid into the riser pipe; and
- a bearing arrangement guiding the motor shaft according to any of the preceding embodiments.

According to a preferred further development, the vertical turbine pump comprises a pressure-side manifold connected to the riser pipe at a first manifold end facing the impeller, wherein the manifold has a curvature continuously away from the axis and comprises an outlet at an opposite second manifold end for the conveyed fluid, wherein a radial diameter as the height of the manifold initially decreases from the first manifold end towards the second manifold end and subsequently increases.

The manifold is preferably shaped as a pipe bend or in a pipe bend-like shape and/or has a circular arc-like or elliptical shape when viewed from the side. The manifold preferably extends over an arc of a circle or circular arc-like over 90°, although other values such as 80° or 100° are possible. In this respect, the feature that the manifold has a curvature continuously away from the axis, precisely does not mean that the manifold initially extends in a direction opposite to the second manifold end, for example has an S-shaped form, but rather extends linearly and/or continuously, in particular in a circular arc-like or elliptical manner, as seen in a side view, with respect to its radial center line further away from the axis or the riser pipe. Furthermore, the feature that the manifold has a curvature continuously away from the axis is to be understood in particular as synonymous with the feature that the manifold extends continuously away from the axis with respect to its radial, in particular circular arc-like, center line. In the case of an elliptical shape extending in particular over 90°, the minor axis of the ellipse preferably extends parallel to the axis and/or the major axis extends horizontally.

The feature that the radial diameter as the height of the manifold initially decreases from the first manifold end towards the second manifold end and then increases means in particular that at at least one position between the first manifold end and the second manifold end the height of the manifold is less than the height at the first manifold end and/or at the second manifold end. In side view, the manifold has in particular a 'flattened' shape. In particular, the manifold may have a 'dented' shape at its outer side, as seen in a side view, wherein at the 'dent' the height is in particular maximally reduced. The radial diameter is understood to mean in particular a radial inner diameter of the manifold, which defines a clear height in the manifold through which the fluid can flow. In this respect, when referring to a reduction or increase in diameter, in addition to the inner diameter the outer diameter can be meant, too.

The motor and the manifold are preferably arranged above the base plate, and the riser pipe is connected to the first manifold end immediately above or at the base plate, in particular in a fluid-tight manner, and the motor is arranged vertically above the manifold. The motor shaft preferably extends in the axial direction along the center line of the riser pipe and, for this purpose, passes through the tubular manifold at an outer side in an axial extension of the riser pipe. At this outer side, thus, an opening can be provided in the manifold through which the motor shaft passes. Preferably, a seal, in particular a radial seal, is provided which is arranged in the opening and seals the motor shaft radially circumferentially in a fluid-tight manner with respect to the manifold.

An essential aspect of the design, described in more detail below, is that the manifold can be designed in the manner of a 'cobra head', namely the height of the manifold is reduced between the two manifold ends. This allows a distance between the motor and a base plate to be reduced, which has a positive effect on the stiffness and natural frequency, and of course on the manufacturing costs of the vertical turbine pump. In other words, the proposed vertical turbine pump is less susceptible to vibration, which improves the operational stability of the vertical turbine pump. The lower vertical height makes the vertical turbine pump easier to maintain or repair, if necessary, since it is easier to get access to the motor and/or the manifold, which are in particular arranged above ground. Furthermore, the manifold with reduced height between the two manifold ends reduces possible turbulence at the outlet, which has a positive effect on a measurement accuracy of pressure and flow rate of a sensor provided at the outlet. Finally, the proposed manifold also improves the hydraulic characteristics of the vertical turbine pump.

According to a preferred further development, the radial diameter initially decreases and then steadily increases. The radial diameter may continuously decrease and/or increase, and it is also possible that the radial diameter remains constant in portions, and decreases and/or increases subsequently. Particularly preferably, the radial diameter does not decrease and/or increase abruptly, but in particular linearly.

According to a particularly preferred embodiment, an axial diameter as the width of the manifold initially increases from the first manifold end to the second manifold end and then decreases. This means in particular that at at least one position between the first manifold end and the second manifold end the width of the manifold is greater than the width at the first manifold end and/or at the second manifold end. In plan view, in particular in the direction of a radius of the manifold, the manifold has a widened shape, in particular in the middle of its extension. In particular, the manifold may in plan view have a bulge, wherein at the axial 'bulge' the width is in particular maximally enlarged. Axial diameter is understood to mean in particular an axial inner diameter of the manifold, which defines a clear width within the manifold through which the fluid can flow.

In a further preferred embodiment, it is provided that a cross-section of the manifold is always the same in the course between the first manifold end and the second manifold end. This means that if the height of the manifold decreases in the course between the first manifold end and the second manifold end, the width of the manifold increases accordingly.

According to another preferred embodiment, a drive lantern comprising a coupling provided between the motor and the motor shaft is arranged between the motor and the manifold, wherein the drive lantern and the manifold including a manifold housing preferably comprising the manifold are designed in one or more parts, in particular in two parts. Preferably, the drive lantern and/or the manifold housing have a rectangular cross-section and/or are of cuboidal design, as seen in a plan view. The manifold housing is preferably fixedly mounted, in particular screwed, on the base plate or the like. The riser pipe preferably extends vertically and/or axially below the base plate and is likewise preferably fixedly mounted, in particular screwed, to the base plate and/or the manifold housing. Preferably, in an axial extension of the riser pipe, the drive lantern is fixed between the manifold housing and the motor, in particular screwed to the manifold housing and the motor.

According to another preferred further development, the manifold has an in particular continuously changing elliptical cross-section between the first manifold end, which has an in particular circular cross-section, and the second manifold end, which has an in particular circular cross-section. Preferably, the minor axis of the elliptical cross-section extends in the radial direction with respect to the manifold as the height of the manifold, while the major axis of the elliptical cross-section extends orthogonally thereto as the width of the manifold. According to another preferred embodiment, the first manifold end and the second manifold end have in particular circular cross-section of same size.

According to another preferred further embodiment, a radius of a radial inner manifold edge increases from the first manifold edge towards the second manifold edge, in particular continuously. In other words, the curvature of the radial inner manifold edge, thus in particular also of the manifold, flattens or reduces continuously from the first manifold edge to the second manifold edge. In this way, the manifold can be designed with a low height relative to the axis of the riser pipe, thus the motor can be disposed closer to the base plate so that vibrations are reduced, resulting in a more stable operation of the vertical turbine pump.

BRIEF DESCRIPTION OF THE DRAWINGS

In the following, the invention is explained in more detail with reference to the accompanying drawings based on preferred exemplary embodiments.

In the drawings.

DETAILED DESCRIPTION OF THE EMBODIMENT EXAMPLES

Figure 1:
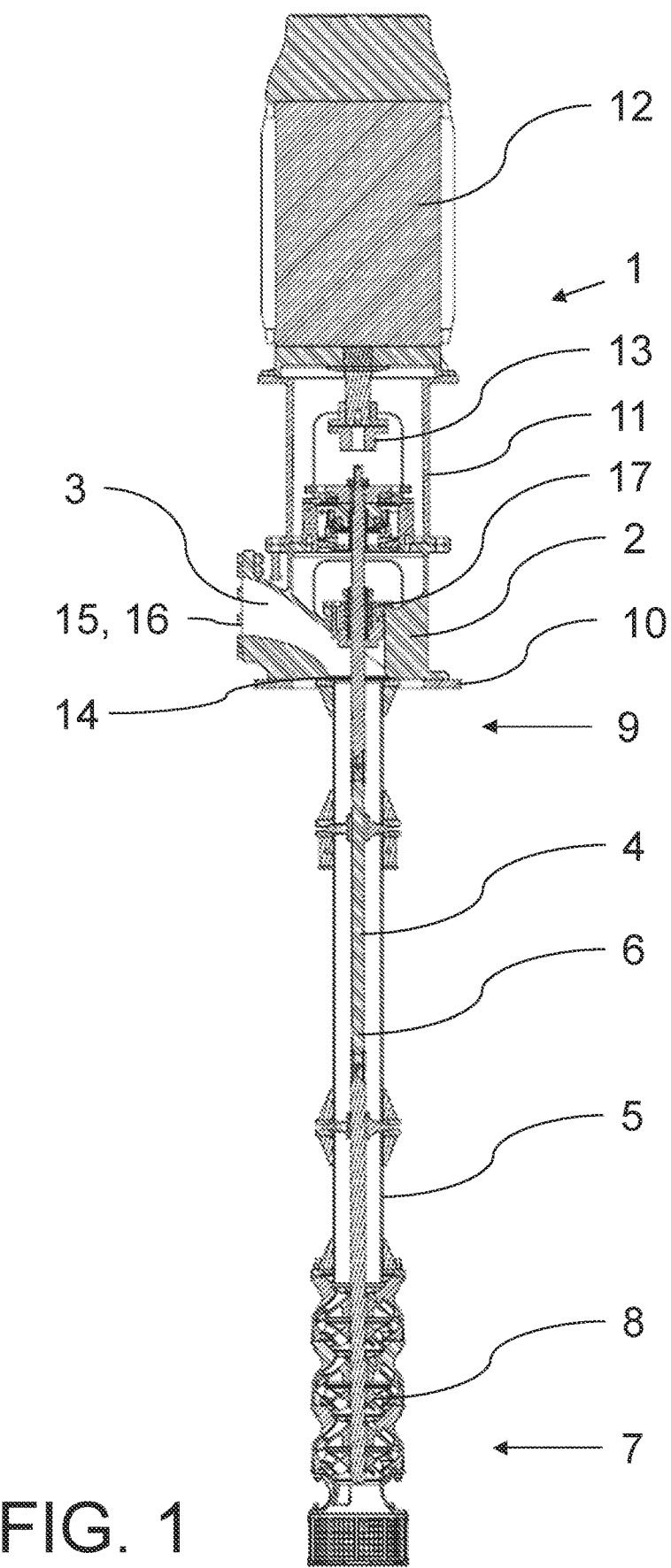
FIG. 1 is a schematic cross-sectional view of a vertical turbine pump according to a preferred exemplary embodiment of the invention.

FIG. 1 shows a schematic cross-sectional view of a vertical turbine pump 1 comprising a manifold housing 2 comprising a manifold 3 according to a preferred exemplary embodiment of the invention.

The vertical turbine pump 1 comprises a riser pipe 5 extending along an axis 4, having a circular outer cross-section and comprising a plurality of interconnected segments. A motor shaft 6 extends centrally in the metal riser pipe 5 along the axis 4 and along the entire length of the riser pipe 5 in such a way that a free space is formed radially around the motor shaft 6 between the latter and the riser pipe 5, through which fluid conveyed by the vertical turbine pump 1 rises axially. For this purpose, several impellers 8 arranged axially one above the other are provided at a lower riser pipe end 7, which are driven by the motor shaft 6, draw in the fluid and convey it into the free space.

The upper riser end 9 of the riser pipe 5 is attached to a base plate 10 so that the riser pipe 5 extends vertically downwards away from the base plate 10. Above the base plate 5, vertically or in the upward direction of the axis 4, first the manifold housing 2 adjoins, which in turn is axially adjoined by a drive lantern 11 and finally by a motor 12 driving the motor shaft 6. A coupling 13 is arranged in the drive lantern 11, which coupling is connected between the motor 12 and the motor shaft 6. The manifold housing 2 and the drive lantern 11 are designed in two parts and are screwed together. The upper riser pipe end 9 is connected in a fluid-tight manner to a first manifold end 14 of the manifold 3, which accordingly faces the impeller 8.

The manifold 3 comprises an outlet 16 for the conveyed fluid at a second manifold end arranged opposite the first manifold end 14. The tubular manifold 3 diverts the conveyed fluid from the vertical to the horizontal, so that cross-sectional surfaces at the first manifold end 14 and the second manifold end 15 are arranged offset from each other by 90°. For this purpose, the inner cross-sectional surfaces of the two manifold ends 14, 15 are of equal size on the one hand and circular on the other.

Figure 2:
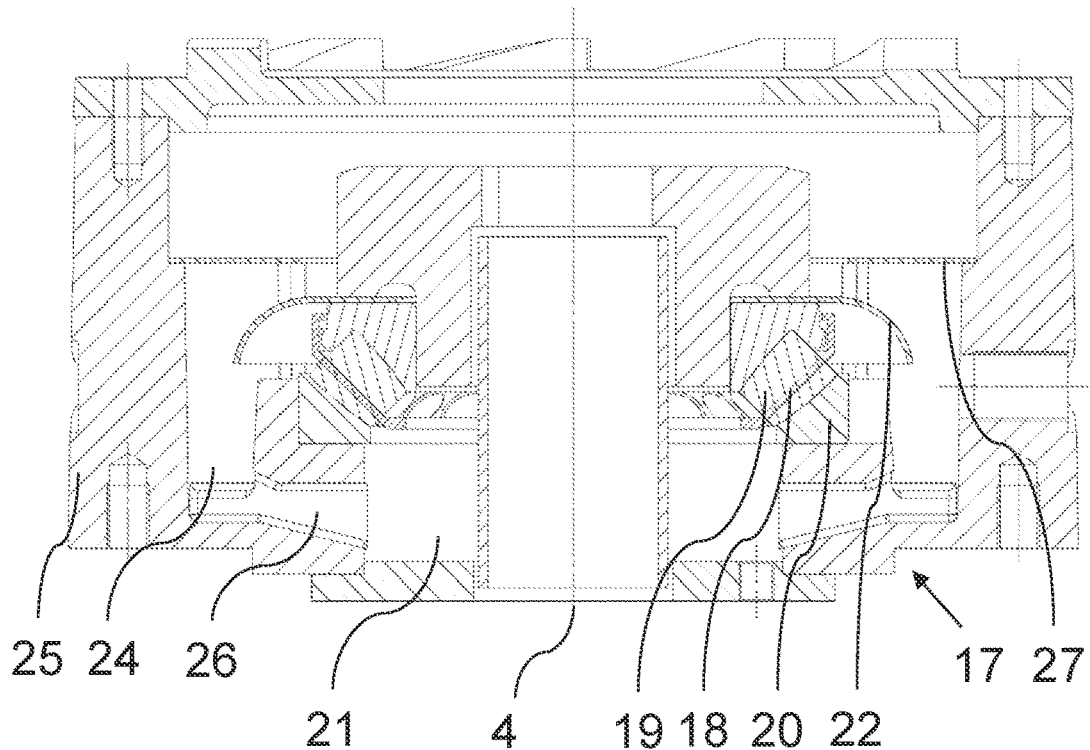
FIG. 2 is a schematic cross-sectional view of a bearing arrangement for guiding a motor shaft of the vertical turbine pump according to FIG. 1 in accordance with the preferred exemplary embodiment of the invention.
Figure 3:
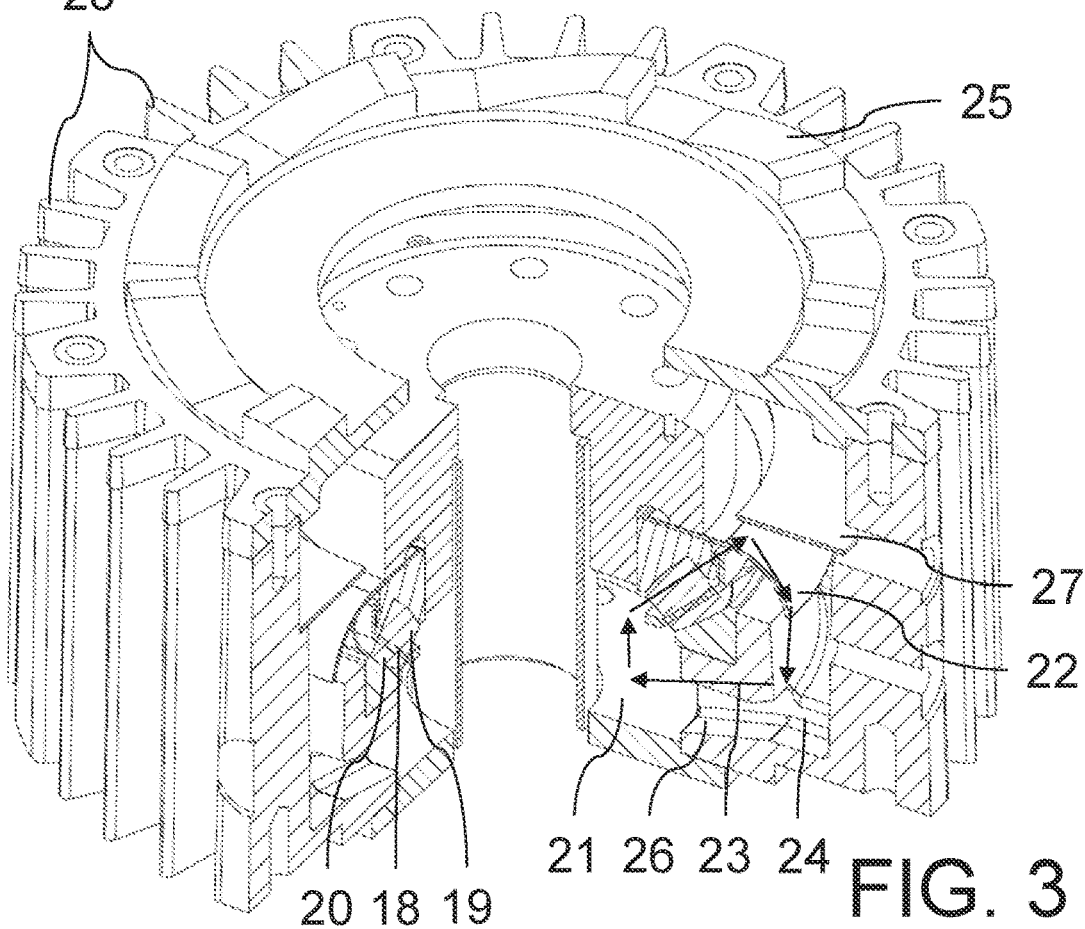
FIG. 3 is a schematic perspective partial cross-sectional view of the bearing arrangement for guiding the motor shaft of the vertical turbine pump according to FIG. 2 in accordance with the preferred exemplary embodiment of the invention.

Inside the manifold housing 2, the motor shaft 6 is guided by a bearing arrangement 17 shown in detail in FIGS. 2 and 3, which is fixedly connected to the manifold housing 2. The bearing arrangement 17 comprises a bearing 18, which is designed as an angular ball bearing, in particular as a tapered roller bearing. An inner ring 19 of the bearing 18 is non-rotatably connected to the motor shaft 6 and rotates accordingly with the motor shaft 6, which is not shown in FIGS. 2 and 3. The bearing 18 extends radially circumferentially around the motor shaft 6. An outer ring 20 is non-rotatably connected to the manifold housing 2.

The bearing arrangement 17 further comprises an oil sump 21 arranged vertically or axially with respect to the axis 4 below the bearing 18 and extending likewise radially circumferentially around the motor shaft 6. The oil sump 21 is filled with oil, which is not shown, in such a way that the bearing 18, including the inner ring 19 and the outer ring 20, is completely covered with oil.

Finally, the bearing arrangement 17 comprises an inner oil deflector 22 which is non-rotatably connected to the inner ring 19 and extends radially away from the motor shaft 6. The inner oil deflector 22 is arranged vertically or with respect to the axis 4 axially above and at a distance from the bearing 18 and, in an axial plan view, is of disc-like design, enclosing the motor shaft 6 centrally. In an axial side view, the inner oil deflector 22 has an umbrella-like shape, as can be seen in FIG. 2, since the inner oil deflector 22 first extends axially away from the motor shaft 6, axially overlapping the bearing 18, and is then bent downward in a quarter-circle-like manner toward the oil sump 21.

A rotary motion of the motor shaft 6 causes the tapered rollers of the bearing 18 to rotate. Due to the centrifugal force, oil located in the bearing 18 is conveyed by the tapered rollers on the oil sump 21 between the inner ring 19 and the outer ring 20 diagonally upward in a pump-like manner away from the motor shaft 6, as indicated in FIG. 3 by arrows 23. Since the inner oil deflector 22, which is curved umbrella-like or soup plate-like, is arranged axially above the bearing 18, the oil thus conveyed hits on the inner oil deflector 22, which deflects the oil axially downward so that the deflected oil drips downward at the quarter-circle-like end of the inner oil deflector 22.

Axially below the curved portion of the inner oil deflector 22, an annular collecting pan 24 extending around the motor shaft 6 in axial plan view is provided for collecting the oil deflected by the inner oil deflector 18. The collecting pan 24 extends in the axial direction between the outer ring 20 and an outer wall 25 of the bearing arrangement 17 radially delimiting the oil sump 21.

Between the collecting pan 24 and the oil sump 21 a plurality of spaced-apart connecting openings 26 in the form of channels extending axially inwardly in the direction of the motor shaft 23 and sloping slightly in the direction of the axis 4 are provided, through which the oil collected in the collecting pan 24 can flow back into the oil sump 21, as indicated by arrows 23. From there, the oil can again be conveyed through the bearing 18 as previously described.

In addition to the inner oil deflector 22, a further oil deflector is provided in the form of an outer oil deflector 27, which is connected non-rotatably with the outer ring 20 or arranged with the outer wall 25 such that it extends radially away from the latter in the direction of the axis 4. With respect to the oil sump 21, the outer oil deflector 27 is arranged axially above the inner oil deflector 22. Like the inner oil deflector 22, the outer oil deflector 27 is configured disc-shaped and extends circumferentially around the motor shaft 6, but has no curvature. The outer oil deflector 27 serves to deflect oil not deflected by the inner oil deflector 22 into the oil sump 21.

Finally, a plurality of axially extending cooling fins 27 are formed circumferentially around the bearing arrangement 17 at the outer wall 25 thereof, through which the oil, in particular the oil flowing back into the oil sump 21, is cooled. For this purpose, the outer wall 26 or the bearing arrangement 17 is made of metal, wherein the cooling fins 27 can be formed of aluminum.

The described exemplary embodiments are merely examples, which may be modified and/or supplemented in a variety of ways within the scope of the claims. Any feature described for a particular exemplary embodiment may be used independently or in combination with other features in any other exemplary embodiment. Any feature that has been described for an exemplary embodiment of a particular category can also be used in a corresponding manner in an exemplary embodiment of another category.

LIST OF REFERENCE SYMBOLS

1 Vertical turbine pump
2 Manifold housing
3 Manifold
4 Axis
5 Riser pipe
6 Motor shaft
7 Lower riser pipe end
8 Impeller
9 Upper riser pipe end
10 Base plate
11 Drive lantern
12 Motor
13 Coupling
14 First manifold end
15 Second manifold end
16 Outlet
17 Bearing arrangement
18 Bearing
19 Inner ring
20 Outer ring
21 Oil sump
22 Inner oil deflector
23 Arrows
24 Collecting pan
25 Outer wall
26 Connecting opening
27 Outer oil deflector
28 Cooling fins

The invention claimed is:

1. A bearing arrangement for guiding a motor shaft and/or for supporting axial and/or radial forces of a vertical turbine pump, the bearing arrangement comprising:
a bearing comprising an inner ring which can be non-rotatably connected to the motor shaft, and an outer ring;
an oil sump filled with an oil, within which the bearing is arranged at least partially immersed in the oil; and
an inner oil deflector which is non-rotatably connected to the inner ring and deflects oil conveyed between the inner ring and the outer ring as a result of a rotation of the bearing back into the oil sump; and
an outer wall which radially delimits the oil sump and at which the outer ring is provided;
wherein a collecting pan for collecting the oil deflected by the inner oil deflector which, in an axial plan view, extends around the outer ring, is provided between the outer wall and the outer ring; and
wherein a plurality of spaced apart axially extending connecting openings for draining oil collected in the collecting pan into the oil sump are provided between the collecting pan and the oil sump.

2. The bearing arrangement according to claim 1, wherein the inner oil deflector at least one of extends radially outwardly from the inner ring or, in an axial plan view, annularly around the inner ring.

3. The bearing arrangement according to claim 1, wherein the inner oil deflector, in an axial side view, is arranged above the oil sump and extends axially obliquely downward and radially away in the direction of the oil sump.

4. The bearing arrangement according to claim 1, comprising an outer wall which radially delimits the oil sump and on the outside of which a plurality of cooling fins are formed.

5. The bearing arrangement according to claim 1, comprising an outer oil deflector which is non-rotatably connected to the outer ring and is arranged axially above the inner oil deflector with respect to the oil sump.

6. The bearing arrangement according to claim 5, wherein the outer oil deflector extends at least one of radially inwardly or, in an axial plan view, extends annularly around the inner ring.

7. The bearing arrangement according to claim 1, wherein the bearing is designed as at least one of a radial bearing, an axial bearing or an angular ball bearing.

8. A vertical turbine pump, comprising:
a riser pipe extending along an axis;
a motor shaft arranged in the riser pipe;
a motor arranged at an upper riser pipe end and driving the motor shaft;
an impeller disposed at an opposite lower riser pipe end and driven by the motor shaft for conveying a fluid into the riser pipe; and
a bearing arrangement guiding the motor shaft according to claim 1.

9. The vertical turbine pump according to claim 8, comprising a pressure-side manifold connected to the riser pipe at a first manifold end facing the impeller and comprising a curvature continuously away from the axis and an outlet at an opposite second manifold end for the fluid conveyed, wherein a radial diameter as height of the manifold initially decreases from the first manifold end towards the second manifold end and subsequently increases.

10. The vertical turbine pump according to claim 9, wherein the radial diameter first continuously decreases and thereupon continuously increases.

11. The vertical turbine pump according to claim 9, wherein an area of a cross-section of the manifold in the course between the first manifold end and the second manifold end is always the same.

12. The vertical turbine pump according to claim 9, comprising a drive lantern provided between the motor and the manifold and comprising a coupling provided between the motor and the motor shaft, wherein the drive lantern and the manifold including a manifold housing are designed in one or more parts.

* * * * *